(12) United States Patent
Kojima et al.

(10) Patent No.: US 7,664,531 B2
(45) Date of Patent: Feb. 16, 2010

(54) COMMUNICATION METHOD

(75) Inventors: Masakazu Kojima, Kawasaki (JP); Yoshiko Tahara, Kawasaki (JP); Fumio Mitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 11/529,386

(22) Filed: Sep. 29, 2006

(65) Prior Publication Data

US 2007/0225048 A1 Sep. 27, 2007

(30) Foreign Application Priority Data

Mar. 23, 2006 (JP) ............... 2006-081656

(51) Int. Cl.
*H04Q 7/32* (2006.01)

(52) U.S. Cl. ............. 455/556.2; 455/566; 455/556.1; 455/550.1; 455/575.1; 455/90.3; 348/14.01; 348/14.02

(58) Field of Classification Search ........... 455/556.1, 455/556.2, 550.1, 556, 90.1, 90.2, 90.3, 466, 455/403, 422.1, 575.1, 557, 412.1, 412.2, 455/445; 348/14.01, 14.02
See application file for complete search history.

(56) References Cited

U.S. PATENT DOCUMENTS

| 5,418,560 | A | 5/1995 | Yasuda |
| 5,982,853 | A | 11/1999 | Liebermann |
| 7,167,703 | B2 * | 1/2007 | Graham et al. ............ 455/415 |
| 2004/0038670 | A1 * | 2/2004 | Ando et al. ............ 455/412.1 |
| 2004/0085259 | A1 | 5/2004 | Tarlton et al. |
| 2004/0261103 | A1 | 12/2004 | Ohno et al. |
| 2005/0107127 | A1 | 5/2005 | Moriya |
| 2005/0108661 | A1 | 5/2005 | Deeds |
| 2006/0125914 | A1 * | 6/2006 | Sahashi ............ 348/14.02 |

FOREIGN PATENT DOCUMENTS

| DE | 200 01 551 U1 | 6/2000 |
| EP | 1 424 839 A1 | 6/2004 |
| EP | 1 441 555 A1 | 7/2004 |
| JP | 2004-54471 | 2/2004 |
| JP | 2005-135169 | 5/2005 |
| WO | WO 03/021796 | 3/2003 |
| WO | WO 03/028386 | 4/2003 |
| WO | WO 2004-114107 | 12/2004 |

OTHER PUBLICATIONS

Extended European Search Report issued by the European Patent Office on Feb. 22, 2007 in Application No. 06121854.1—2223 (8 pages).

* cited by examiner

*Primary Examiner*—Keith T Ferguson
(74) *Attorney, Agent, or Firm*—Staas & Halsey LLP

(57) ABSTRACT

An information processing apparatus according to an embodiment of the present invention is capable of communication and exchanging images with a different information processing apparatus, and comprises a storage unit for storing a display pattern dictionary including one or a plurality of finger character images, each finger character image corresponding to a character and/or a numeral and representing a finger character, an operation unit for inputting a character and/or a numeral, an image selecting unit for selecting, from the display pattern dictionary, a finger character image corresponding to the character and/or numeral input by the operation unit, and a transmitting unit for transmitting the selected finger character image to the different information processing apparatus.

9 Claims, 9 Drawing Sheets

(a)

(b)

START FINGER CHARACTER IMAGE

} TRANSITIONAL FINGER CHARACTER IMAGE

TARGET FINGER CHARACTER IMAGE

COMMUNICATION METHOD

BACKGROUND OF THE INVENTION

1. Field of the Invention

The present invention relates to information processing apparatuses capable of transmitting images to and receiving images from a different information processing apparatus, and, in particular, to an information processing apparatus that achieves communication by using images.

2. Description of the Related Art

In recent years, cellular phones have come into wide use, and electronic mail exchanges by using cellular phones are actively performed. In addition, many cellular phones have camera functions. Accordingly, communication in so-called videophone form or the like is frequently performed such that users of cellular phones capture images of users' appearances by using the camera functions of the cellular phones and transmit and receive the appearance images, as needed.

In addition, also a hearing-impaired person, such as deaf-mutes, can achieve communication in videophone form by using cellular phones.

FIG. 1 is a conceptual diagram of a call performed in videophone form.

Specifically, as shown in FIG. 1, when communication is achieved in videophone form, a user of a cellular phone 1 transmits an image, such as a user's appearance, captured by using a camera 11, to a cellular phone 2 of a other user. The other user similarly transmits an image, such as a user's appearance captured by using the camera 21, to the camera 1 of the user. Both users use the cellular phones 1 and 2 to perform a call while visually recognizing their appearances by displaying the received images on display units 12 and 22. As described above, videophone form enables visual communication. Even hearing-impaired persons, such as deaf-mutes, can establish video communication with the cellular phones 1 and 2 by using the cellular phones 1 and 2 to transmit and receive actions, such as sign language signs, as moving images. However, video communication can be expensive to transmit and receive actions as moving images.

In addition, disclosures of methods in communication means using cellular phones for more variously expressing user's emotions include the Japanese Unexamined Patent Application Publication No. 2004-54471, and No. 2005-135169.

However, the cellular phone described in Japanese Unexamined Patent Application Publication No. 2004-54471, and No. 2005-135169 can more variously express transmitter's emotions but cannot improve cellular phone convenience for deaf-mutes or the like.

In addition, in general, when a videophone function of a cellular phone is used, the cellular phone has large power consumption, thus causing a problem in that sufficient duration of a call cannot be secured compared with an only-voice call. Furthermore, in performance of a camera of the present cellular phone, a display image is unclear, and, in the present situation, smooth communication cannot be performed. In particular, since the videophone function cannot sufficiently operates in an environment having no sufficient lightness, an image of a person itself cannot be captured, so that it is difficult to achieve visual communication. In addition, videophone communication using a cellular phone has a problem in that call charges are expensive since handling of moving pictures requires a large amount of data.

SUMMARY OF THE INVENTION

Accordingly, the present invention realizes enabling even hearing-impaired persons, such as deaf-mutes, to more variously express their emotions for achieving communication by using cellular phones while maintaining reduced costs of call charges without increasing power consumption of the cellular phones.

In accordance one embodiment of the present invention, a method for communicating with a different information processing apparatus, includes storing a display pattern dictionary including information codes corresponding one-to-one with images, inputting the information codes, transforming a portion of displayed images in response to the information codes input by inputting means to display a target image, transmitting data corresponding to the target image to the different information processing apparatus.

DESCRIPTION OF THE PREFERRED EMBODIMENTS

Figure 1:
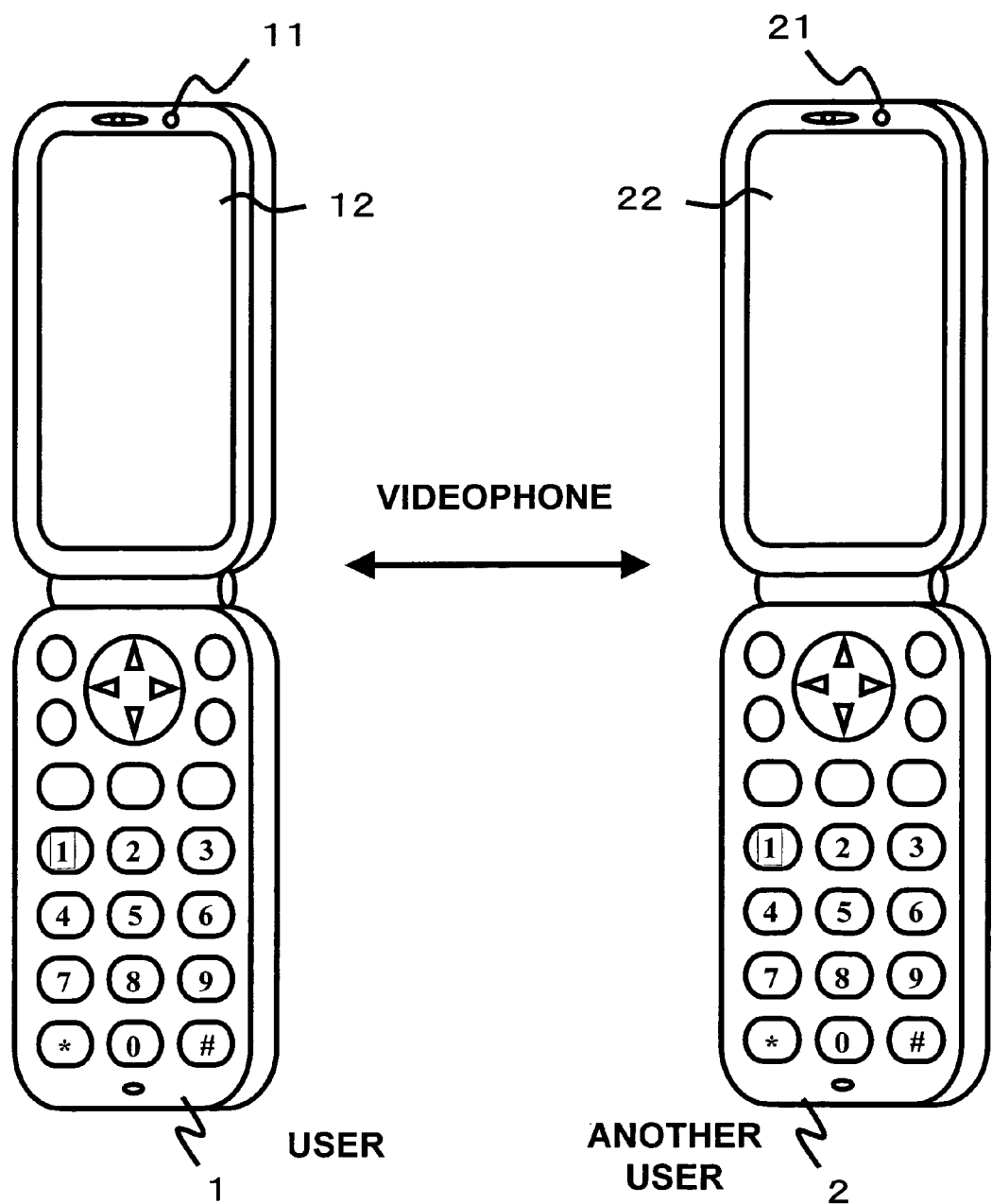
FIG. 1 shows a cellular phone of the related art.
Figure 2:
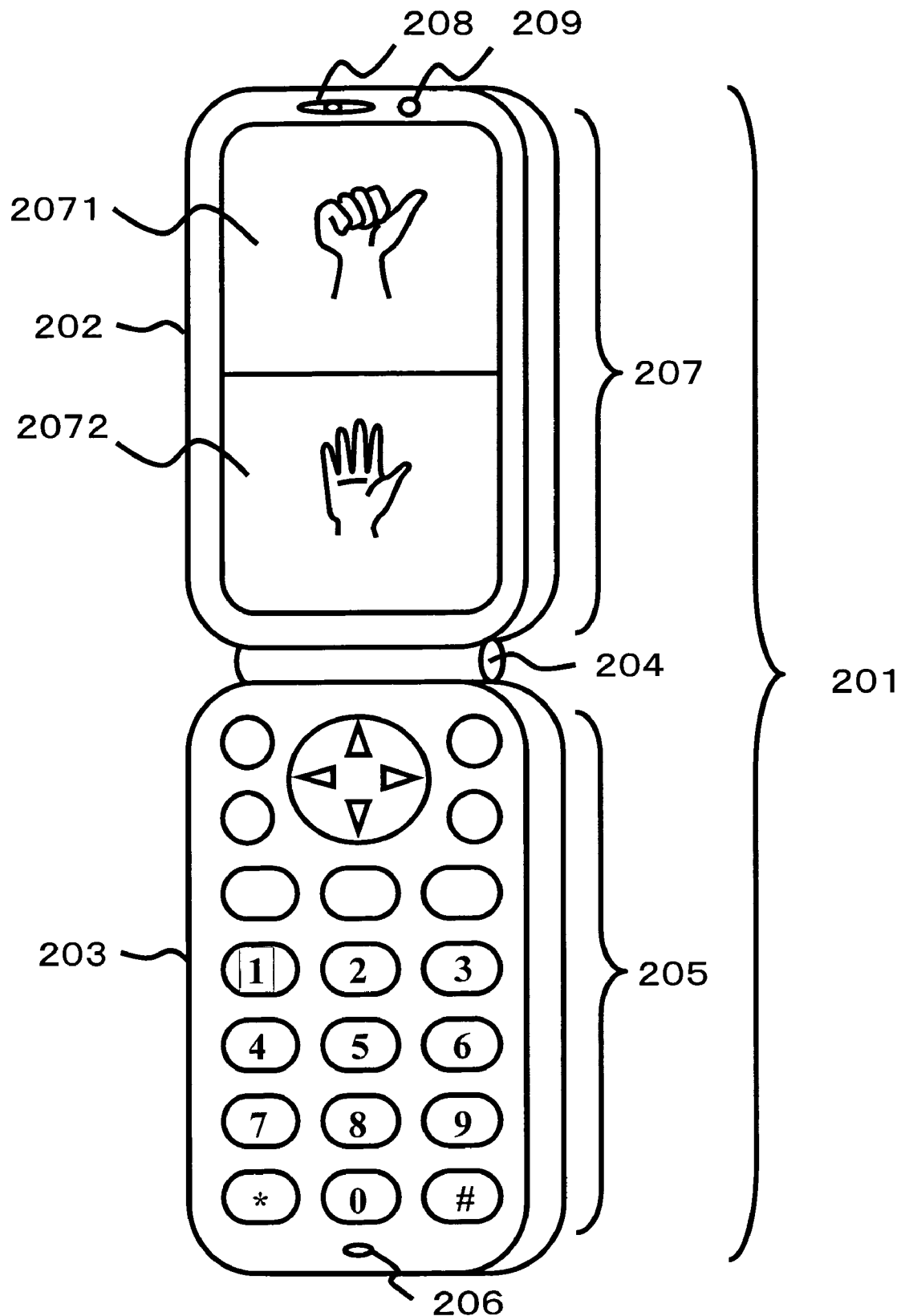
FIG. 2 shows a cellular phone according to an embodiment of the present invention.

FIG. 2 is a schematic view of an information processing apparatus according to an embodiment of the present invention.

In this embodiment, an example of a mobile wireless communication phone is used as an example of an information processing apparatus 201 (hereinafter also referred to as a cellular phone 201). Obviously, the information processing apparatus 201 is not limited to a cellular phone, but may be an information processing apparatus that can communicate by wire or wirelessly with another information processing apparatus. For example, the information processing apparatus can be a PC (Personal Computer) or a PDA (Personal Digital Assistance).

The cellular phone 201 is formed so that housing portions 202 and 203 can be opened and closed by using a hinge 204 to connect both portions. The housing portion 203 has an operation unit 205 mounted thereon, and the housing portion 202 includes a display unit 207, speaker 208, and camera 209 mounted thereon. A screen of the display unit 207 displays a menu representation, mail text, etc. A user interface displayed on the display unit 207 comprises one or more information display areas. For example, the user interface can be split into two information display areas 2071 and 2072. The operation unit 205 includes, for example, numerical keys, a call key, a call-end key, functions keys, and arrow keys. By using the operation unit 205, the user can input a telephone number and a mail address, and can call each function of the cellular phone 201 and can perform an operation of the called function.

The cellular phone 201 has wireless connection to a base station, and performs communication with another cellular phone through an exchange connected to the base station.

Figure 3:
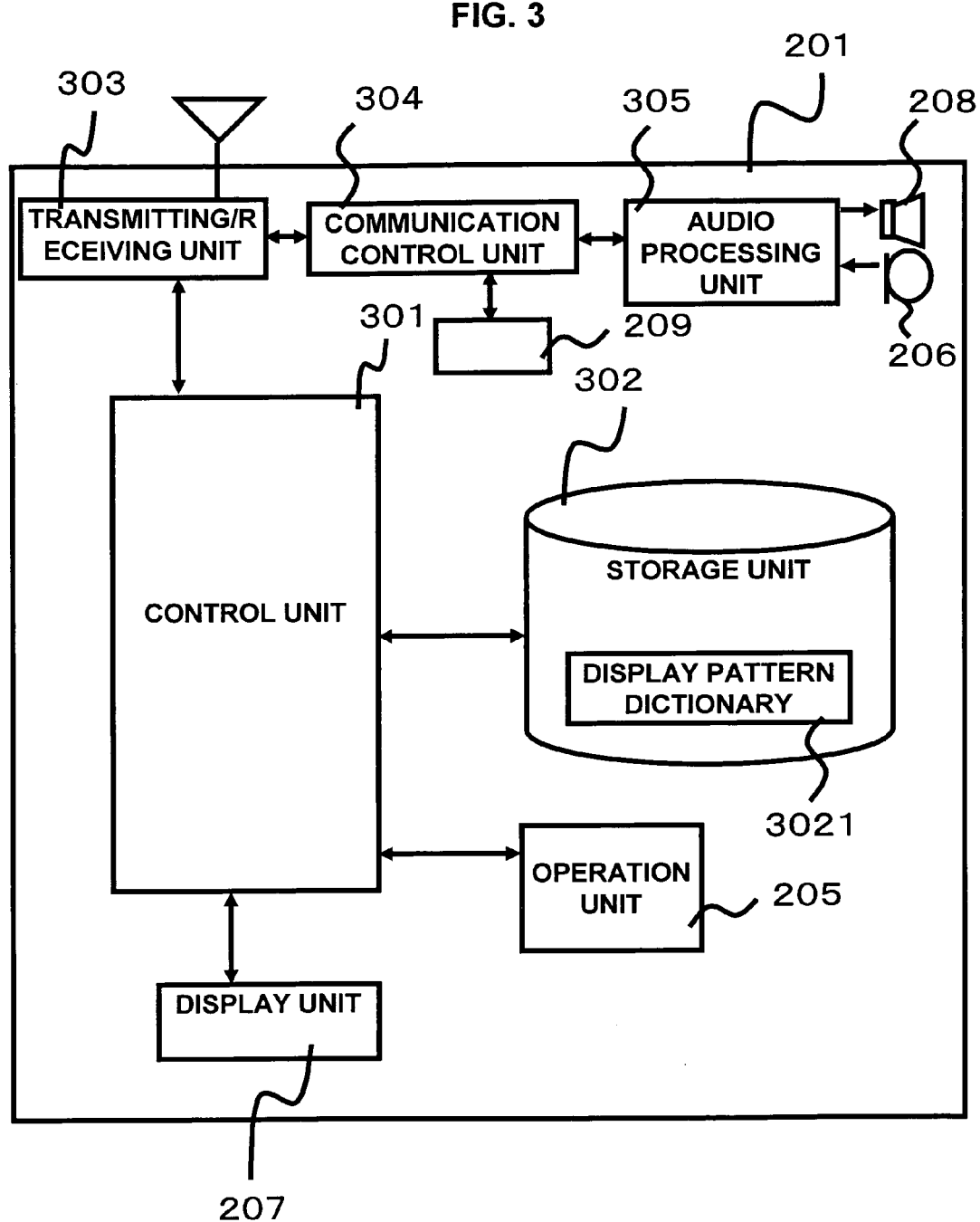
FIG. 3 is a functional block diagram of the hardware of the cellular phone 201 according to an embodiment of the present invention.

FIG. 3 is a functional block diagram of the hardware of the cellular phone 201 according to an embodiment of the present invention.

The cellular phone 201 includes a control unit 301, a storage unit 302, a transmitting/receiving unit 303, a display unit 207, and the operation unit 205, a communication control unit 304, an audio processing unit 305, a speaker 208, a microphone 206, and the camera 209.

The control unit 301 is formed by a computer including a CPU, a ROM, and a RAM, and performs various type of control of the storage unit 302, the transmitting/receiving unit 303, the display unit 207, and the operation unit 205. These types of control are performed by processing such as execution of a control program stored in the ROM of the control unit 301. A location for storing the control program is not limited to the ROM, but may be a different recording medium corresponding to the ROM.

The storage unit 302 collectively indicates a ROM (read-only memory), a RAM (random access memory), etc. The storage unit 302 may be formed by a removable recording medium, and may be formed by, for example, a flash memory, or the like, as a memory in which stored content is not lost even if its power is switched off.

Figure 6:
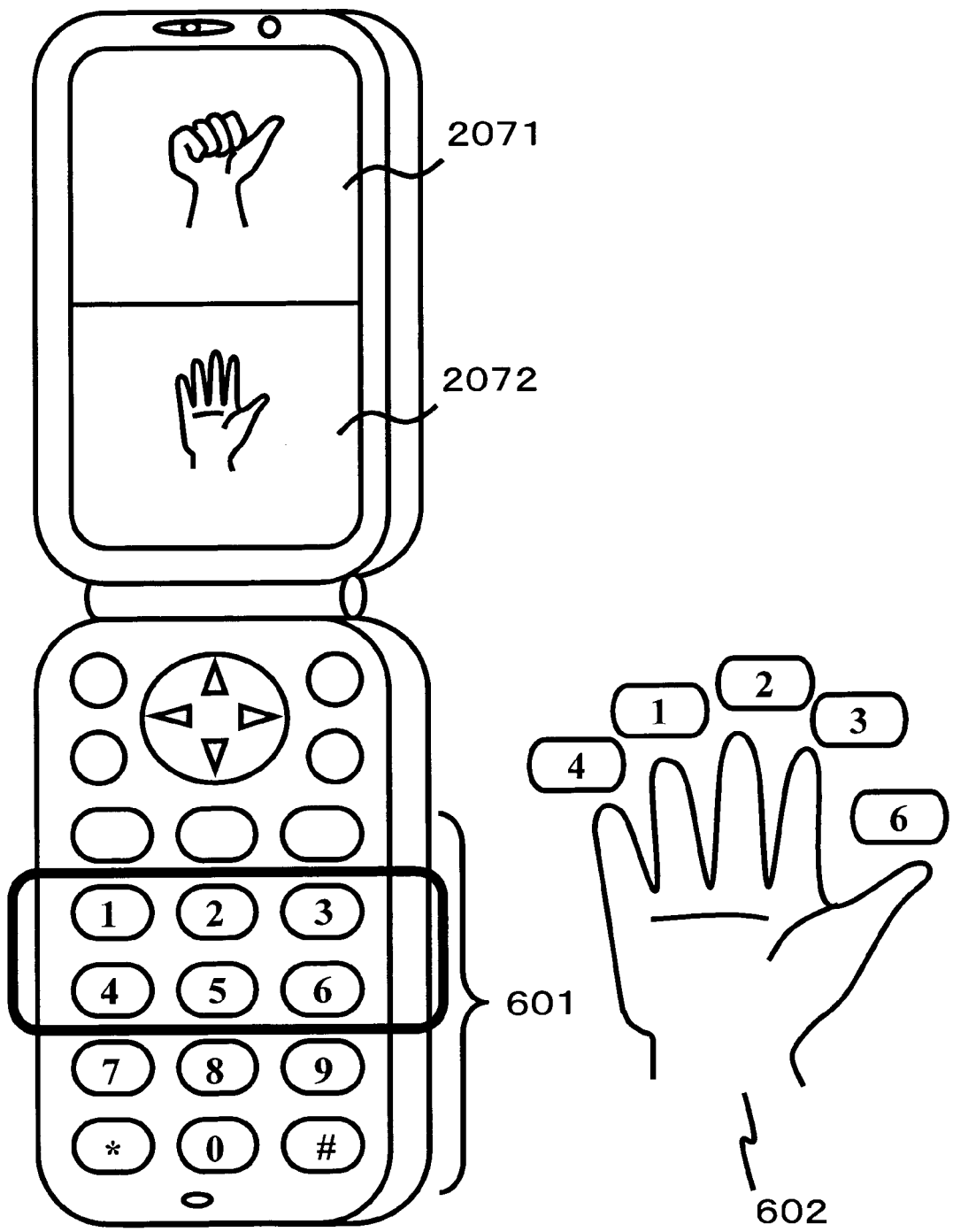
FIG. 6 is an conceptual diagrams of the universal communication process, according to an embodiment of the present invention.
Figure 7:
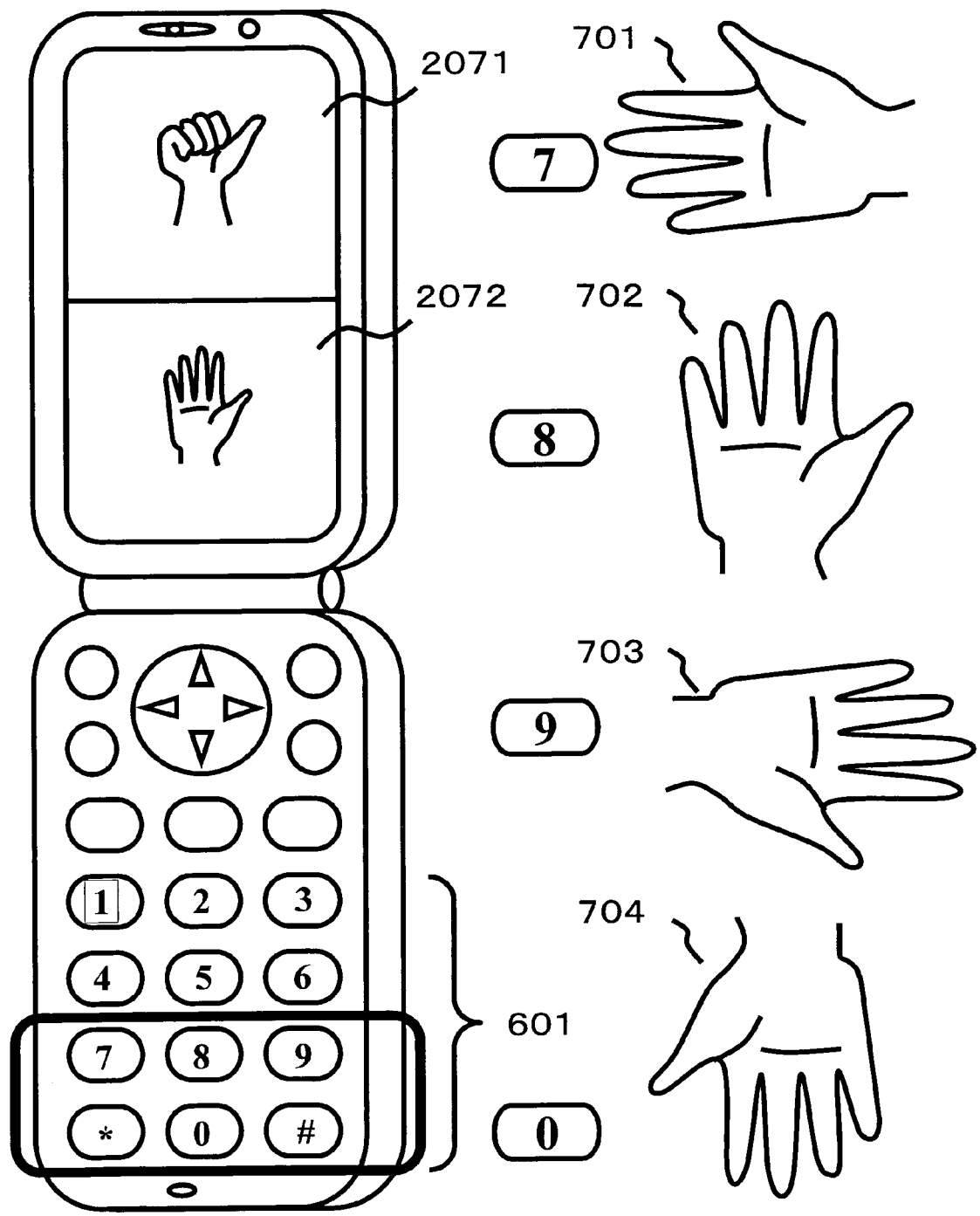
FIG. 7 is an conceptual diagrams of the universal communication process, according to an embodiment of the present invention.

The storage unit 302 stores a display pattern dictionary 3021. The display pattern dictionary 3021 includes still images (hereinafter referred to as finger character still images) representing finger characters corresponding to resonant sounds in the Japanese language, and action images (hereinafter referred to as finger character action images) representing Japanese semi-voiced sounds, voiced sounds, germination sounds, prolonged sounds, contracted sounds, and a Japanese syllable pronounced "ng". The display pattern dictionary 3021 also includes numeral-finger-character still images and numeral-finger-character action images. The display pattern dictionary 3021 further includes alphabet-finger-character still images and alphabet-finger-character action images corresponding to the 26 letters of the English alphabet. The alphabet-finger-character still images and the alphabet-finger-character action images are images in which the 26 letters of the English alphabet are represented by one hand, both hands as sign language signs. The finger character still images, the finger character action images or, the numeral-finger-character still images, the numeral-finger-character action images, the alphabet-finger-character still images, or the alphabet-finger-character action images, any combinations thereof are collectively called the target finger character images according to a transformation thereof. Target finger character images are images that are formed by transforming a target finger character image as a start finger character image. FIG. 7 are examples of start finger character image, displayable on the phone 201, according to an embodiment of the present invention. Start finger character images are images 701, 702, 703, and 704 in FIG. 7. When the user presses one key of "7", "8", "9", and "0" keys among the numerical keys 601 in FIG. 7, the control unit 301 displays one start finger character image of start finger character images 701, 702, 703, 704 on information display area 2072. A left-pointing hand 701 is assigned to the "7" key. An upward hand 702 is assigned to the "8" key. A right-pointing hand 703 is assigned to the "9" key. A downward hand 704 is assigned to the "0" key. FIG. 6 is a mobile wireless communication phone user interface displaying a start finger character image, according to an embodiment of the present invention. When the user wishes to display a start finger character image of a hand directed in a desired direction on information display area 2072, the user presses a key assigned to the direction. When the user presses one key of "1", "2", "3", "4", and "6" keys among the numerical keys 601 in FIG. 6, the control unit 301 transforms start finger character images 701, 702, 703, 704 to transitional finger character images in display area 2071. Transitional finger character images are images of a hand in which, for example, one or more fingers are folded until a desired target finger character image is displayed. Fingers of a hand 602 in FIG. 6 which represent finger character images are assigned to "1", "2", "3", "4", and "6" keys among numerical keys 601 included in the operation unit 205. For example, an annular finger is assigned to the "1" key. A middle finger is assigned to the "2" finger. An index finger is assigned to the "3" key. A little finger is assigned to the "4" key. A thumb is assigned to the "6" key. When the user wishes to display a transitional finger character image of the hand with a desired finger folded, the user presses a key assigned to the finger for transforming a start finger character image to a transitional finger character image or a target finger character image.

Figure 9:
FIG. 9 is an transition diagram of a target finger character image, according to an embodiment of the present invention.
Figure 9:
Figure 9:
Figure 9:
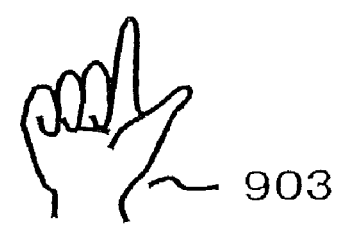
Figure 9:

FIG. 9 is an transition diagram of a target finger character image according to an embodiment of the present invention. A target finger character image expresses an English alphabet "a". The user selects an universal communication form as a call form and presses the "8" key to display the start finger character image 702 on the information display area 2072. After that, the user presses the "4", "1", "2" keys in turn and the control unit 301 displays the transitional finger character images 901, 902, 903 in turn. The control unit 301 updates the start finger character image 702 displayed on the information display area 2072 into the transitional finger character images 901. Similarly, the control unit 301 updates the transitional finger character image 901 displayed on the information display area 2072 into the transitional finger character images 902. The control unit 301 updates the transitional finger character image 902 displayed on the information display area 2072 into the transitional finger character images 903. Finally, by pressing the "3" key, the control unit 301 updates the transitional finger character image 903 displayed on the information display area 2072 into the target finger character images 801 and displays the target finger character image 801 on the information display area 2072. The user presses a determination key, and the control unit 301 determines the creation of the target finger character image 801 displayed on the information display area 2072. Then the control unit 301 transmits the target finger character image 801 or the series of code corresponding to the target finger character image 801 to the cellular phone of the other user.

The transmitting/receiving unit 303 generates wireless signal radio waves (to be transmitted and received) by performing transmission and/or reception of wireless signal radio waves through an antenna.

The communication control unit 304 performs modulation, demodulation, etc., on carrier signals based on signals representing still and moving images captured by the camera 209, a call signal, a dial signal, etc.

The audio processing unit 305 is connected to the speaker 208 and the microphone 206. The audio processing unit 305 converts an analog audio signal captured from the microphone 206 into a digital signal, and converts a digital audio signal output from the control unit 301 into an analog signal. The speaker 208 is used to play back the audio signal output from the control unit 301 and the audio signal captured through the microphone 206.

The display unit 207 includes LCD (liquid crystal display) elements, and displays various types of information input to and output from the control unit 301.

The operation unit 205 includes the numeral keys, the call key, the call end key, the function keys, and the arrow keys. By using the operation unit 205, the user can perform a call operation, and can perform an operation for transmitting data for a target finger character image (e.g., one or more codes, one or more transitional finger character image, or any combinations thereof.) to the cellular phone of the other user.

Next, a call using the cellular phone 201 is described.

At first, the user selects a call form by using the operation unit 205. Call forms in this embodiment include a voice call form, a videophone form that performs a call by transmitting and receiving moving images captured from expressions of users and audio corresponding to the moving images, or a universal communication form that performs a call by displaying, on screens of cellular phones of one user and another user or another communication apparatus thereof, target finger character images that corresponds to letters of Japanese language, numeral or English alphabet, based upon one or more user inputs of series of code corresponding to one or more target finger character images. In the universal communication form, the control unit 301 also displays start finger character images or transition finger character images on the information display areas 2071, 2072. The voice call form and the videophone form comply with the related art. In this embodiment, only a call performed in the universal communication form is described below. According to an aspect of the embodiment, a universal design that meets the needs of disable, for example, deaf mutes, is provided for communicating by a mobile When the user selects the universal communication form, the control unit 301 displays a user interface image on the display unit 207, for example a display area split into display area 2071 and 2072. The displayed user interface is not limited to a display with the screen split into two, but may be displayed with the screen split into a different number of screen areas, or may be displayed with the screen un-split.

By operating the operation unit 205 to call another user, the user attempts communication with the other user. When the other user permits communication in the universal communication form, both cellular phones enter a state capable of a call. In addition, when the cellular phone 201 receives an incoming call from the other user in the universal communication form, the operation unit 205 is operated by the user to determine whether to permit communication in the universal communication form. According to an aspect of the embodiments, the described universal communication user permission process can be optional, because the universal communication user permission is provided to confirm universal communication capability or to handle circumstances in which a mobile wireless communication phone 201 might not provide a universal communication mode, and the embodiments are not limited to such a configuration and a universal communication mode compatibility/capability may be determinable automatically to omit the user permission process.

The user uses the operation unit 205 to input a series of code corresponding to a target finger character image to be transmitted to the another user.

The control unit 301 accesses the display pattern dictionary 3021 stored in the storage unit 302, displays a series of code and/or target finger character images corresponding to the input series of codes or the like on the information display area 2071/2072, and transmits the target finger character image and/or a series of codes to the cellular phone of the other user. The cellular phone of the other user receives the target finger character image and/or the series of codes and displays a target and/or one or more transitional finger character image and/or a series of code. In this case, the display style of the cellular phone of the other user can be arbitrary. The display style may be a display style in which the screen is split and the target finger character image and/or the series of code is displayed on one of the split screens, and may be another display style. Similarly, also the other user inputs a series of code to be conveyed to the user, and transmits a corresponding target finger character image and/or a series of code to the cellular phone 201. When the cellular phone 201 uses the transmitting/receiving unit 303 to receive the target finger character image and/or the series of code from the cellular phone of the other user, the cellular phone 201 can display the target finger character image received from the other user on the information display area 2071/2072.

When the user inputs the next code corresponding to a start finger character image, the target finger character image displayed on the information display area 2072 is updated into the start finger character image corresponding to the input the code and the corresponding start finger character image is displayed on the information display area 2072. The user inputs a series of code and the start finger character image is transformed to a transitional finger character image. After the user determines a target finger character image by pressing the determination key, the target finger character image corresponding to the next series of code input by the user is transmitted to the cellular phone of the other user. Subsequently, in a similar manner, the user and the other user input series of code corresponding to a target finger character image, perform transmission and reception of target finger character images corresponding to the input a series of code, and updates the target finger character images for display on the information display area 2071 and 2072. According to an aspect of the embodiments, the control unit 301 also displays start finger character images or transitional finger character images corresponding to series of code input by the user, on the information display area 2072. On the information display area 2071, the control unit 301 displays target finger character images that the cellular phone 201 receives by transmitting/receiving unit 303 from the other cellular phone of the user. On the information display area 2072, the control unit 301 displays start finger character images, transitional finger character images, or target finger character images corresponding to one or more series of code that the user of the cellular phone 201 inputs.

In addition, the display pattern dictionary 3021 may be stored in a server apparatus capable of wirelessly communicating with the cellular phone 201 without being stored in the storage unit 302 of the cellular phone 201. For example, after the user inputs a desired series of codes, the desired series of codes corresponding to the desired target finger character image is transmitted also to the server apparatus. The server apparatus selects, from a display pattern dictionary, a target finger character image corresponding to the received series of codes. The server apparatus transmits the selected target finger character image to the cellular phone of another user.

This enables the user and another user to create a sentence to be conveyed by using one or more target finger character images. Accordingly, even hearing-impaired persons, such as deaf-mutes, can easily achieve communication by using cellular phones. According to an aspect of the embodiments, deaf mutes can easily communicate by a mobile phone 201 with still images and/or pre-stored motion images and/or codes corresponding thereto, and without live camera video capture of users and live video transmissions thereof that can be costly, slow, and/or inefficient, unreliable or likely incomprehensible due to poor live video capture and play.

Figure 4:
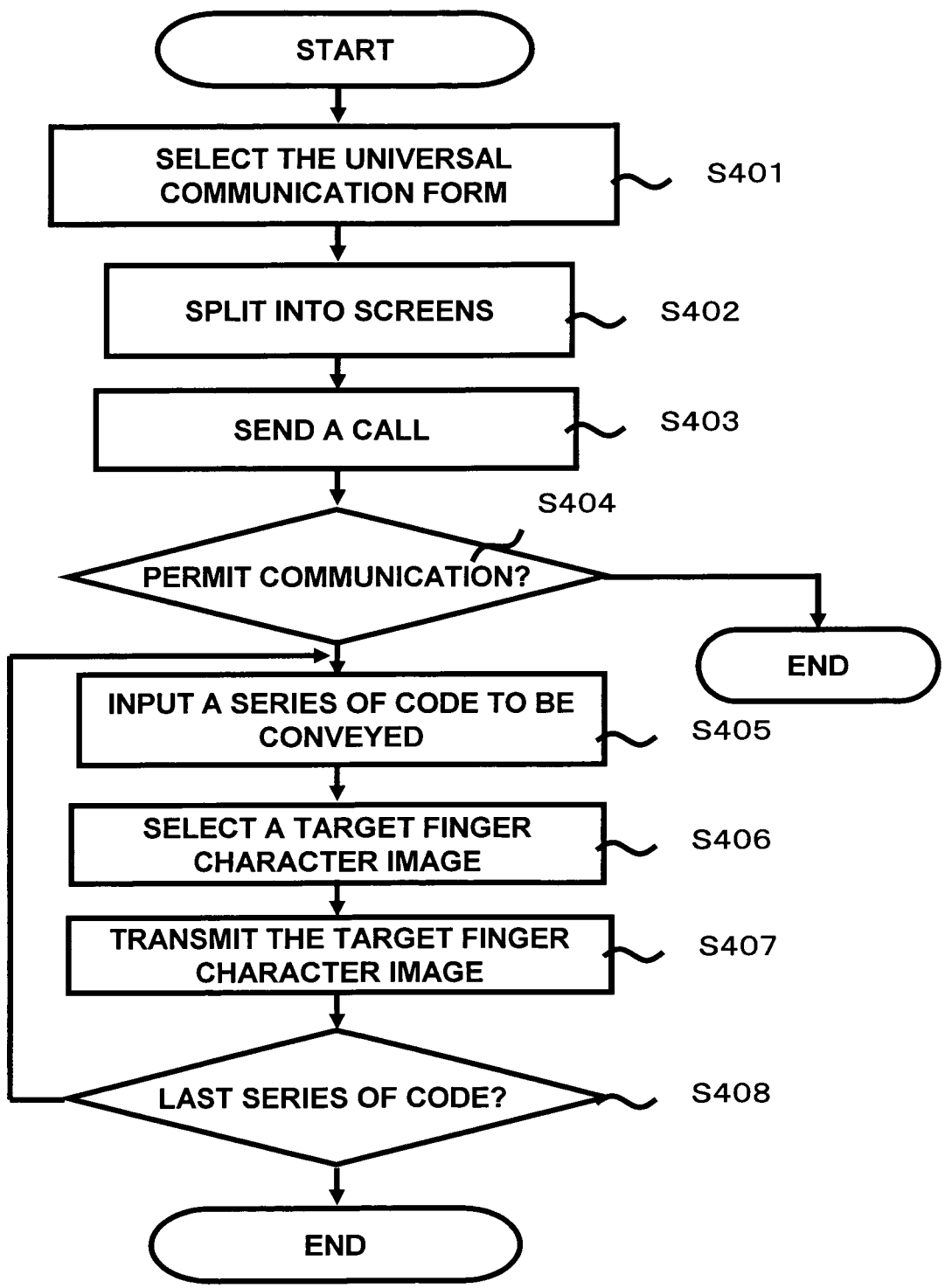
FIG. 4 is a flowchart of a universal communication process according to an embodiment of the present invention.

FIG. 4 is a flowchart of a universal communication process according to an embodiment of the invention.

At first, the user uses the operation unit 205 of the cellular phone 201 to select the universal communication form as a call form (step S401).

When the user selects the universal communication form, display is performed in a form in which the screen of the display unit 207 is split into the information display areas 2071 and 2072 (step S402).

The user specifies another user or another communication apparatus to whom the user attempts a call, and sends a call to the other user (step S403). For example, the user specifies the other user by performing an operation such as inputting a telephone number or selecting a other user's telephone number from an address book registered in the cellular phone 201 beforehand.

Although, in this embodiment, the call is sent after the universal communication form is selected, a manner in which the universal communication form is selected after the call is sent to the other user may be employed. For example, when the cellular phone 201 of the user sends a call to the other cellular phone of the other user, the control unit 301 notify the user of a selection of a call form by using the operation unit 205. The user selects universal communication form as a call form by pressing a predetermined key in the operation unit 205.

The other user transmits, to the cellular phone 201, a permission/nonpermission notification indicating whether to permit the cellular phone of the other user to perform communication in the universal communication form, and the control unit 301 determines whether the permission/nonpermission notification permits communication in the universal communication form (step S404).

If the control unit 301 has determined that the permission/nonpermission notification does not permit the communication in the universal communication form, the universal communication process finishes. If the control unit 301 has determined that the permission/nonpermission notification permits communication in the universal communication form, the cellular phone establishes a link to the cellular phone of the other user. The information display area 2072 displays a character input screen, and the user inputs a a series of code to be conveyed by operating the operation unit 205 (step S405).

The control unit 301 calls the display pattern dictionary 3021 stored in the storage unit 302, and selects a target finger character image corresponding to the series of codes input by the user from the display pattern dictionary 3021 (step S406). The control unit 301 displays the selected target finger character image on the information display area 2072. In this case, the control unit 301 transmits the target finger character image or a series of character code representing a target finger character image to the cellular phone of the other user (step S407). At S405-S406 the control unit 301 displays the selected target finger character image on the information display area 2072 as a series of transition finger character images, whereby the user can view the target finger character image displayed on the information display area 2072 and can easily notice a false input, etc. Also, instead of the target finger character image, the input series of code may be displayed on the information display area 2072 or both.

The control unit 301 determines whether the series of code input in step S405 is the last series of code (step S407). When the user determines that the series of code input in step S405 is the last series of code corresponding to the target finger character image, the user presses an end key in the operation unit 205.

If the control unit 301 does not detect a signal on the basis of the pressing the end key and determines that the series of code input by the user is not the last series of code, the control unit 301 stands by for the next series of code (step S405). If the control unit 301 detects the next series of code corresponding to the next target finger character image, the control unit 301 selects the next target finger character image corresponding to the input series of code in the display pattern dictionary 3021. The target finger character image displayed on the information display area 2072 is updated by selecting a newly selected target finger character image corresponding to the newly input series of code (step S406), and the updated target finger character image is displayed on the information display area 2072. The control unit 301 transmits the new target finger character image corresponding to the newly input series of code to the cellular phone of the other user (step S407). Similarly, the user and the other user input series of code, the control unit 301 transmits and receives target finger character images corresponding to the input series of code, and update the target finger character images for display on the information display areas 2071 and 2072.

If the control unit 301 detects a signal on the basis of the pressing the end key and determines that the series of code input by the user is the last series of code, the control unit 301 finishes the universal communication process. Here, determination of whether the input series of code is the last series of code of a sentence is performed depending on whether the user has pressed the end key and input an instruction indicating that an input of target finger character images finishes.

Figure 5:
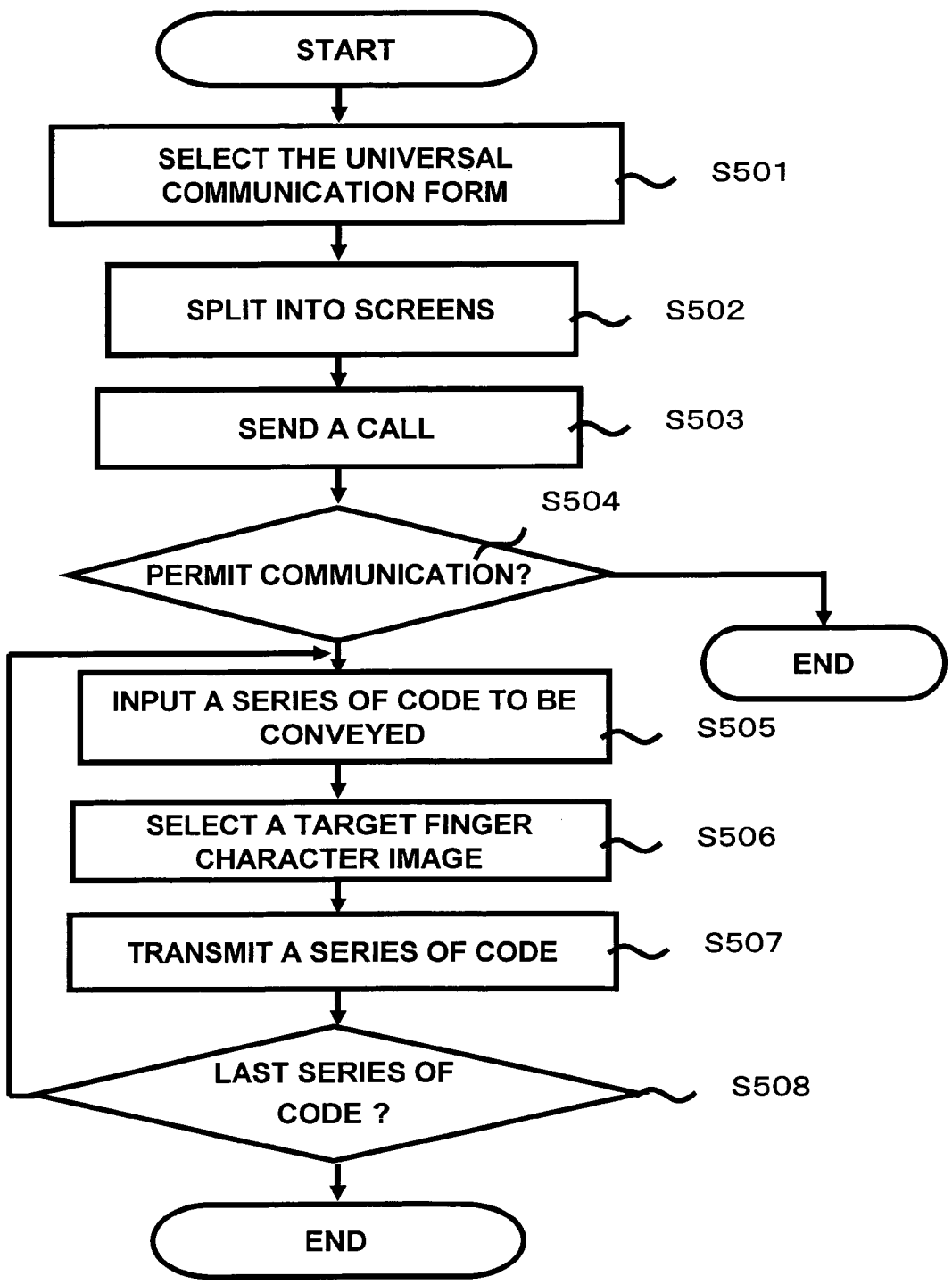
FIG. 5 is a flowchart of a universal communication process according to another embodiment of the present invention.

Next, a different embodiment of the universal communication process is described. FIG. 5 is a flowchart of the universal communication process according to another embodiment of the present invention.

In the universal communication process in accordance with the flowchart shown in FIG. 5, a target finger character image is not transmitted to the cellular phone of the other user, but a series of codes representing a target finger character image is transmitted.

At first, by using the operation unit 205 of the cellular phone 201, the user selects a universal communication form as a call form (step S501).

When the user selects the universal communication form, display is performed on the information display area of the display unit 207 in a form in which the screen is split into the information display areas 2071 and 2072 (step S502).

The user specifies another user or another communication apparatus to whom the user attempts a call, and sends a call to the other user (step S503). For example, the user specifies the other user by performing an operation such as inputting a telephone number or selecting a telephone number of the other user from an address book registered in the cellular phone 201 beforehand.

Although, in this embodiment, the call is sent after the universal communication form is selected, a manner in which the universal communication form is selected after the call is sent to the other user may be employed. For example, when the cellular phone 201 of the user sends a call to the other cellular phone of the other user, the control unit 301 notify the user of a selection of a call form by using the operation unit 205. The user selects universal communication form as a call form by pressing a predetermined key in the operation unit 205.

The other user transmits, to the cellular phone 201, a permission/nonpermission notification indicating whether to permit communication in the universal communication form, and the control unit 301 determines whether or not the permission/nonpermission notification permits communication in the universal communication form (step S504).

If the control unit 301 has determined that the permission/nonpermission notification does not permit the communication in the universal communication form, the universal communication process finishes. If the control unit 301 has determined that the permission/nonpermission notification permits communication in the universal communication form, the cellular phone establishes a link to the cellular phone of the other user and enters a state of the universal communication form. The information display area 2072 displays a target finger character input screen, and the user inputs a series of code to be conveyed by operating the operation unit 205 (step S505).

The control unit 301 calls the display pattern dictionary 3021 stored in the storage unit 302, and selects a target finger character image corresponding to the series of code input by the user from the display pattern dictionary 3021 (step S506). The control unit 301 displays the selected target finger character image on the information display area 2072. In this case, the control unit 301 transmits the series of codes representing the target finger character image to the cellular phone of the other user (step S507). At S405-S406, the control unit 301 displays the selected target finger character image on the information display area 2072 as a series of transition finger character images, whereby the user can view the target finger character image displayed on the information display area 2072 and can easily notice a false input, etc. Also, instead of the target finger character image, the input series of codes may be displayed on the information display area 2072 or both. The series of code may be a series of codes representing a target finger character image. After receiving the series of codes, a control unit of the cellular phone of the other user calls a display pattern dictionary stored in a storage unit of the cellular phone of the other user and selects a target finger character image representing the series of codes. The selected target finger character image is displayed on the screen of the cellular phone of the other user.

The control unit 301 determines whether the series of codes input in step S505 is the last character of a sentence (step S507). When the user determines that the series of code input in step S505 is the last series of codes corresponding to the target finger character image, the user presses an end key in the operation unit 205.

If the control unit 301 does not detect a signal on the basis of the pressing the end key and determines that the series of codes input by the user is not the last series of code, the control unit 301 stands by for the next series of codes (step S505). If the control unit 301 detects the next series of codes corresponding to the next target finger character image, the control unit 301 selects the next target finger character image corresponding to the input series of code in the display pattern dictionary 3021. The target finger character image displayed on the information display area 2072 is updated by selecting a newly selected target finger character image corresponding to the newly input target finger character image (step S506), and the updated target finger character image is displayed on the information display area 2072. The control unit 301 transmits the new series of codes corresponding to the newly target finger character image to the cellular phone of the other user (step S507). Similarly, the user and the other user input the series of codes, the control unit 301 transmits and receives series of code corresponding to input target finger character images, and update the target finger character images for display.

If the control unit 301 detects a signal on the basis of the pressing the end key and determines that the series of code input by the user is the last series of code corresponding to the last target finger character image of a sentence, the control unit 301 finishes the universal communication process. Here, determination of whether the input series of code is the last series of code corresponding to the last target finger character image of a sentence is performed depending on whether the user has pressed the end key and input an instruction indicating that input of target finger character images is finished.

Next, a different embodiment of the universal communication process is described.

Figure 8:
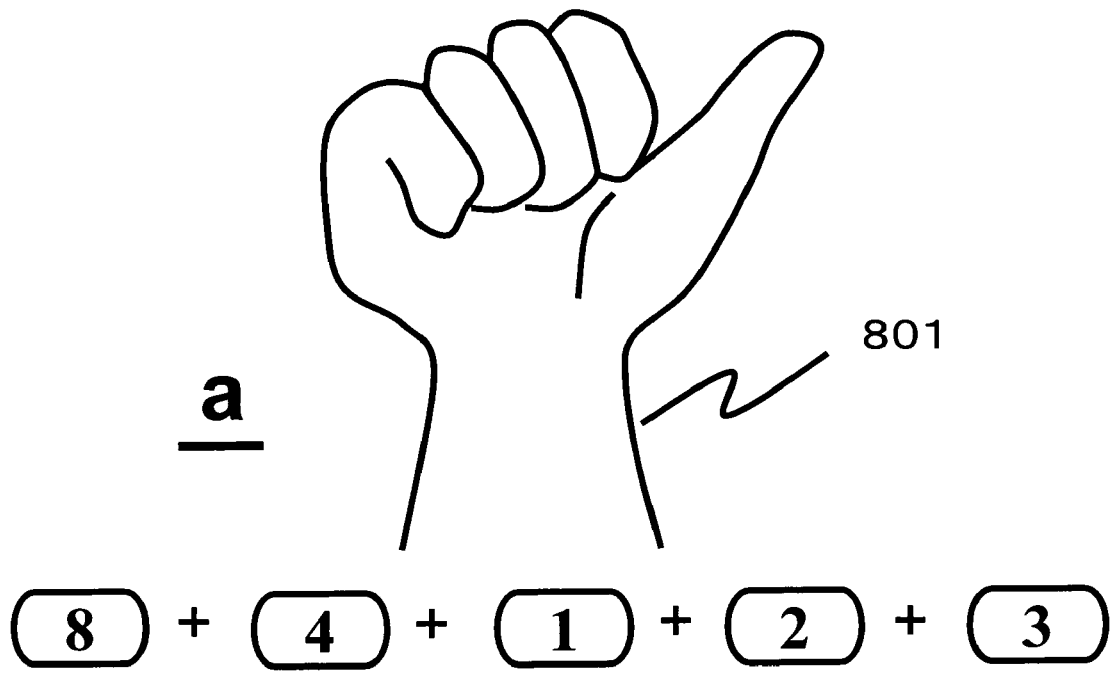
FIG. 8 consists of schematic views of finger character images created by pressing keys, according to an embodiment of the present invention.
Figure 8:
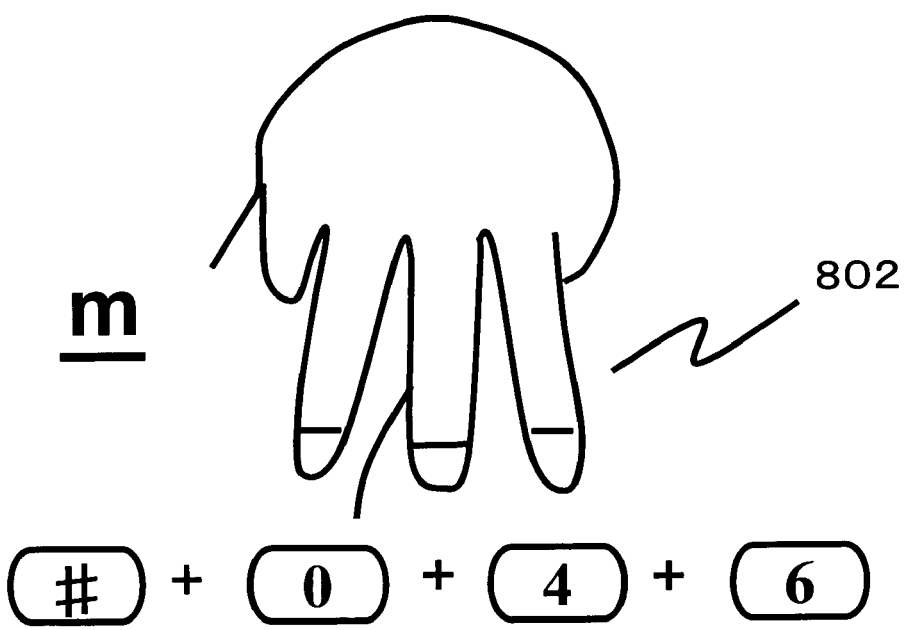

FIGS. 6, 7, and 8 are diagrams of the universal communication process, according to an embodiment of the present invention.

At first, as shown in FIG. 6, fingers of a hand 602 which represent finger character images are assigned to "1", "2", "3", "4", and "6" keys among numerical keys 601 included in the operation unit 205. An annular finger is assigned to the "1" key. A middle finger is assigned to the "2" finger. An index finger is assigned to the "3" key. A little finger is assigned to the "4" key. A thumb is assigned to the "6" key. When the user wishes to display an image of the hand with a desired finger folded, the user presses a key assigned to the finger. The image with the desired finger folded is displayed on the information display area 2071/2072 by a user pressing another predetermined key to display a desired transitional finger character image or a target finger character image that shows one or more fingers are folded. The hand 602 is a right hand and its palm is shown.

In addition, as shown in FIG. 7, four directions of the hand 602 are assigned to "7", "8", "9", and "0" keys among the numerical keys 601. A left-pointing hand 701 is assigned to the "7" key. An upward hand 702 is assigned to the "8" key. A right-pointing hand 703 is assigned to the "9" key. A downward hand 704 is assigned to the "0" key. When the user wishes to display an image of a hand directed in a desired direction, the user presses a key assigned to the direction.

The back of the hand is assigned to a "#" key. When the user wishes to display a hand whose back can be seen, the user presses the "#" key. When the user wishes to display again a hand whose back can be seen, the user presses the "#" key again. In this embodiment, by pressing the "#" key an odd number of times, the hand whose back can be seen is displayed on the information display area 2072, and, by pressing the "#" key an even number of times, the hand whose palm can be seen is displayed on the information display area 2072.

By combining the keys assigned to target finger character images and/or as transformations thereof, the user can create a target finger character image, and transmits the target finger character image to another user's cellular phone.

FIG. 8 consists of schematic views of target finger character images created by pressing the keys.

For example, as shown in FIG. 8(a), when a target finger character image corresponding to an English alphabet "a" is displayed and is to be transmitted to the cellular phone of the other user, the user presses the "8", "4", "1", "2" and "3" keys. After that, by pressing a predetermined determination key, creation of the target finger character image corresponding to an English alphabet "a" is completed, and the target finger character image is displayed on the information display area 2072 and is transmitted to the cellular phone of the other user. Here, a call-end key is used as the determination key. In addition, as shown in FIG. 8(b), a target finger character image corresponding to an English alphabet "m" is displayed on the information display area 2072 and is to be transmitted to the cellular phone of the other user, the user presses the "#", "0", "4", and "6" keys. By pressing the call-end key, creation of the target finger character image corresponding to the English alphabet "m" is completed, and the finger character image is displayed on the information display area 2072 and is transmitted to the cellular phone of the other user. Order in which the above keys are pressed is not limited but may be a combination of the above keys.

Further, for example, the "5" key is assigned to switching between "folding" and "stretching" of a finger. After the user finger presses the "5" key, when the user presses the "1", "2", "3", "4", and "6" keys, an image showing that fingers assigned to the keys are stretched is displayed on the information display area 2072. In this embodiment, by pressing the "5" key an odd number of times, predetermined keys (the "1", "2", "3", "4", and "6" keys) serve as keys for stretching a finger. By next pressing the "5" key an odd number of times, predetermined keys (the "1", "2", "3", "4", and "6" keys) serve as keys for folding a finger.

In addition, after the user creates a desired target finger character image, a character code representing the target finger character image may be transmitted to the cellular phone of the other user. When the control unit of the cellular phone of the other user receives the character code, it calls a display pattern dictionary stored in the storage unit of the cellular phone of the other user and selects a finger character image represented by the character code. The selected finger character image is displayed on the screen of the cellular phone of the other user.

Processing performed by an image selecting unit described in the Claims is performed by the control unit 301, and processing performed by a character code selecting unit is also performed by the control unit 301.

The embodiments are not limited to a mobile phone, and can be a any information processing apparatus or computer capable of communication and exchanging images with another information processing apparatus or computer capable of communication and exchanging images with another information processing apparatus. According to an aspect of the embodiments, the herein-described processes are implemented in software and/or computing hardware.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing apparatus capable of communication and exchanging images with another information processing apparatus, the information processing apparatus comprising:
    a display unit to display an image;
    an operation unit to input an alphabet character and/or a numeral; and
    a controller to control the apparatus according to a process comprising:
        receiving a series of alphabet characters and/or numerals as input codes;
        selecting, from a display pattern dictionary including one or a plurality of images, a plurality of images including a start image, one or a plurality of transitional images and a target image corresponding to the input codes;
        displaying the start image on the display unit;
        updating the display of the start image into the one or the plurality of transitional images and the target image in turn in accordance with a sequence of the input codes; and
        a transmitting unit to transmit data corresponding to the target image to another information processing apparatus.

2. The information processing apparatus according to claim 1, further comprising a storage unit to store the display pattern dictionary.

3. The information processing apparatus according to claim 1, wherein the process of the controller further comprises:
    displaying a user interface with a plurality of display areas; and
    displaying the plurality of images including the target image in one of the display areas; and
    displaying an image received from the other information processing apparatus on another display area.

4. The apparatus according to claim 3, wherein the plurality of images in the display pattern dictionary comprise hand still images including hand movements, wherein the target image is a sign language sign based upon the hand still images.

5. The apparatus according to claim 4, wherein the process of the controller further comprises displaying a user interface to display a sequence of the input codes corresponding to the displayed hand still images.

6. The apparatus according to claim 4 wherein the process of the controller further comprises allowing a sequence of the input codes to form a sentence in the sign language.

7. The apparatus according to claim 1, wherein the target image is a sign language sign and the process of the controller further comprises, displaying only the input codes and transmitting only the input code, as the data corresponding to the target image.

8. The apparatus according to claim 1, wherein the transmitting data comprises transmitting the input codes only, the plurality of images, the target images, or any combinations thereof, to the other information processing apparatus.

9. A method of communication and exchanging images with another information processing apparatus, the method comprising:
    inputting an alphabet character and/or a numeral;
    receiving a series of alphabet characters and/or numerals as input codes;
    selecting, from a display pattern dictionary including one or a plurality of images including a start image, one or a plurality of transitional images and a target image, a plurality of images corresponding to the input codes respectively;
    displaying the start image;
    updating the display of the start image into the one or the plurality of transitional images and the target image in turn in accordance with a sequence of the input codes; and
    transmitting data corresponding to the target image to another information processing apparatus.

* * * * *